United States Patent
Johnson

(10) Patent No.: US 9,862,588 B2
(45) Date of Patent: Jan. 9, 2018

(54) FITMENT FOR DISPENSING FLUIDS FROM A FLEXIBLE CONTAINER

(71) Applicant: Liqui-Box Corporation, Richmond, VA (US)

(72) Inventor: James W. Johnson, Delaware, OH (US)

(73) Assignee: Liqui-Box Corporation, Richmond, VA (US)

( * ) Notice: Subject to any disclaimer, the term of this patent is extended or adjusted under 35 U.S.C. 154(b) by 0 days.

(21) Appl. No.: 15/180,776

(22) Filed: Jun. 13, 2016

(65) Prior Publication Data

US 2017/0113912 A1    Apr. 27, 2017

Related U.S. Application Data

(60) Provisional application No. 62/174,694, filed on Jun. 12, 2015.

(51) Int. Cl.
*B67D 1/08* (2006.01)
*F16L 37/40* (2006.01)
*B67D 1/00* (2006.01)

(52) U.S. Cl.
CPC ......... *B67D 1/0835* (2013.01); *B67D 1/0807* (2013.01); *F16L 37/40* (2013.01); *B67D 2001/0094* (2013.01); *B67D 2001/0827* (2013.01)

(58) Field of Classification Search
CPC ............... B67D 1/0807; B67D 1/0835; B67D 2001/0094; B67D 2001/0827; F16L 37/40
USPC ........................................................ 141/351
See application file for complete search history.

(56) References Cited

U.S. PATENT DOCUMENTS

| | | | |
|---|---|---|---|
| 4,421,146 A | 12/1983 | Bond et al. | |
| 4,445,551 A | 5/1984 | Bond et al. | |
| 5,031,662 A * | 7/1991 | Roethel | F16L 29/04 137/614.03 |
| 5,095,962 A * | 3/1992 | Lloyd-Davies | B65B 3/045 141/114 |
| 5,680,970 A * | 10/1997 | Smith | B65D 47/248 222/509 |
| 5,697,410 A * | 12/1997 | Rutter | F16L 37/32 137/614.04 |
| 5,901,761 A | 5/1999 | Rutter et al. | |
| 5,983,964 A * | 11/1999 | Zielinksi | F16L 29/00 137/614.04 |

(Continued)

FOREIGN PATENT DOCUMENTS

WO    WO 2004/085283 A1    10/2004

*Primary Examiner* — Timothy L Maust
*Assistant Examiner* — Andrew Schmid
(74) *Attorney, Agent, or Firm* — Baker & Hostetler LLP

(57) ABSTRACT

This invention relates to a fitment assembly used for dispensing liquids from flexible bags. The connector engages a valved fitment for a container for holding and dispensing fluid. The fitment includes a spout connected to the container and a sliding internal valve body and an external valve body securely positioned within the spout. The connector has a fitment end mateable with the fitment so as to compress the top edge of the external valve body so as to form a seal between the external valve body and the dispensing connector. The external valve body through circumferentially placed apertures allows for substantially complete drainage of the flexible bag.

16 Claims, 10 Drawing Sheets

( INTERNAL SLIDER PIN OPENS CONNECTOR )

(56) References Cited

U.S. PATENT DOCUMENTS

| | | | |
|---|---|---|---|
| 6,347,785 B1 * | 2/2002 | Copp | B67D 1/0835 137/269 |
| 6,637,725 B2 * | 10/2003 | Davis | B67D 1/0835 137/269 |
| 6,779,556 B2 * | 8/2004 | Roethel | F16L 29/04 137/614.03 |
| 6,953,070 B1 * | 10/2005 | Labinski | B67D 3/02 137/614.03 |
| 8,578,979 B2 | 11/2013 | Johnson | |
| 2004/0256424 A1 | 12/2004 | Johnson | |
| 2009/0045224 A1 | 2/2009 | Faaborg et al. | |
| 2010/0176151 A1 | 7/2010 | Johnson | |
| 2012/0305590 A1 | 12/2012 | Johnson | |
| 2013/0048683 A1 | 2/2013 | Nufer et al. | |

\* cited by examiner

Pre-Cap Position

Full-Cap Position ( CONNECTOR O-RING ENGAGED )
( CONNECTOR SEALED IN BODY )

( INTERNAL SLIDER PIN OPENS CONNECTOR )

FITMENT FOR DISPENSING FLUIDS FROM A FLEXIBLE CONTAINER

CROSS REFERENCE TO RELATED APPLICATIONS

This application claims the benefit of U.S. Provisional Application No. 62/174,694, filed Jun. 12, 2015, of which is incorporated by reference herein in its entirety.

TECHNICAL FIELD

In one aspect, the present invention relates to quick-disconnect couplings for the dispensing of liquids and semi-liquids from a collapsible bag. More particularly, the present invention relates to a double slider valve fitment for use in a quick-disconnect coupling that can empty the collapsible bag substantially fully during dispensing.

BACKGROUND

Many systems are used for dispensing beverage syrup from a disposable package consisting of a flexible collapsible bag in a corrugated box commonly referred to as a bag-in-box dispensing package.

Generally these systems include a bag that is provided with a fitment in the form of a spout through which filling and dispensing occurs. It is generally desirable to provide a quick-disconnect coupling between the spout and the service-line of the beverage mixing and dispensing system, for example, a pump. Such a coupling may be carried on the spout fitment of the bag and will work in conjunction with the service-line connector or "probe." Because it is discarded with the bag when emptied, in the packaging art it is commonly referred to as a single-service valve and coupling. This type of valve opens automatically as the line connector is connected to the spout and closes as it is disconnected therefrom to prevent syrup from draining from the bag.

Quick-connect valve systems and slider fitments for fluid dispensing are known. Certain fitments having valves having more than one moveable component are also known. Some systems are dedicated to only one type of currently known service line connection; while others are adapted to be used with various types of service line connectors.

U.S. Pat. No. 4,445,551 (Bond, et al.) teaches a cylindrical tubular valve member having a closed lower end positioned within a spout. Gripping lugs on the valve member are adapted to grip the dispensing connector. For dispensing, the dispensing connector pushes the valve member inwardly so that outlets on the side thereof are open to fluid flow. A seal is produced between the O-ring on the dispensing connector and the valve body.

U.S. Pat. No. 4,421,146 (Bond and Ulm) teaches a dispensing valve assembly for coupling to a service line connector. The valve member has gripping members that cooperate with the dispensing connector to move the valve between a closed and open position. The dispensing connector also has a collar for gripping the spout. An O-ring on the dispensing connector provides a seal with the valve.

U.S. Pat. No. 6,347,785 (Copp, et al.) discloses a universal quick-disconnect coupling and valve. The fitment includes a generally cylindrical spout for attachment to a container that is capable of mating with a dispensing connector. A slider moves axially within the spout and has a valve within it that moves from a closed position to an open position upon insertion of a dispensing connector into the slider. An external support member and clamp about the dispensing connector has teeth to engage the flange of an external adapter ring of the spout. The dispensing connector is sealed within the slider by an O-ring which cooperates with an internal adapter sleeve that fits within the slider.

U.S. Pat. No. 5,031,662 (Roethel #1), U.S. Pat. No. 6,779,556 (Roethel #2) and U.S. Pat. No. 6,953,070 (Labinski, et al.) teach a dispensing fitment having a first body secured to a liquid container and forming a first flow passage and a valve assembly connected to this secured body, which has a seal retaining body defining a second flow passage that communicates with an inlet of the first flow passage. A resilient seal member located in the second flow passage is resiliently urged into sealing engagement with the inlet to block fluid flow from the second flow passage into the first flow passage. The assembly further includes a spout that is slideable within the first body to an inward position where the seal member is moved resiliently away from the inlet to allow fluid flow between the passages. The seal retaining body is a resilient tubular member transverse to the first flow passage and is made of a resilient (i.e. rubber) material. A dispensing connector collar has grooves for engaging flanges on the first body. The dispensing connector includes O-rings for sealingly engaging the valve assembly.

U.S. Pat. No. 5,983,964 (Zielinksi, et al.) teaches a dispensing apparatus for coupling between a dispensing connector and the spout of a container so as to permit coupling of a valve sub-assembly housed in the dispensing connector with a single slider valve assembly housed in the spout. The apparatus includes a collar about the dispensing connector and includes sleeves having at least two resilient fingers members. Each finger member has a surface engageable with a flange portion on the outer surface of the spout. A collar is releasably slid over an outer surface of the sleeve for constricting the resilient finger members toward a lower end of the sleeve. The fingers act to lock the collar relative to the spout. The system provides a single-handed coupling operation for the collar and spout. An O-ring on the probe forms the seal with the valve assembly and an inner O-ring connects with the valve sub-assembly. The collar does not engage the valve assembly housed in the spout.

U.S. Pat. No. 5,095,962 (Lloyd-Davies, et al.) teaches a fluid dispensing device comprising a valve member slideable in the spout of a container. The single valve member is tubular and has an open outer end for receiving a dispensing connector and a closed inner end. The valve member has openings through its sidewalls. In the closed position of the valve member, opposed shoulders of the valve member and of the spout resist axial movement of the valve member in either direction and interengaged sealing surfaces block fluid flow to the openings. The outer end portion of the valve member is laterally outwardly deflectable and includes protrusions adapted to enter the recess of a dispensing connector and engage the dispensing connector whereby the valve member can be moved between the open and closed position. In the dispense position, an O-ring provides a seal between the outside of the dispensing connector and the inner wall of the valve member.

U.S. Pat. No. 5,697,410 (Rutter et al. #1) and U.S. Pat. No. 5,901,761 (Rutter, et al. #2) teach a spout fitment for a liquid container. The fitment includes a dispensing valve member slideable within the spout of the container. A valve element within the slideable dispensing valve member is resiliently biased to close a fluid flow opening therein. The valve element sits on the inside of a wall extending across the slideable dispensing valve member and a resilient member is required to push the valve element against the inner surface of this wall. Given this arrangement, a snap fit of parts is not possible. In the dispensing position, an O-ring on the dispensing connector forms a seal with the slideable dispensing valve member. The member may also include a ridge for engaging the O-ring and snapping into an associated groove on the dispensing connector. In some embodiments, a ridge on a dispensing connector shown can apparently press down on the top edge of the slideable dispensing valve member.

U.S. Pat. No. 5,680,970 (Smith and Tschanen) teach a self-closing dispensing valve comprising a valve housing having a fluid conduit with a valve orifice therethrough and a flow control member within the valve body. The flow control member is displaceable between a closed and open position. A plurality of resilient flexible fingers are fixed to either the valve housing or the valve member and are deflected when the valve member is displaced to its open position. The fingers are deflected by a conical camming surface on the valve member when displaced toward the open position.

International Patent Application Publication No. WO 2004/085283 (Johnson) teaches a double slider valve fitment for attachment to a container for fluid. The fitment includes a spout having an external surface capable of mating with a collar of a dispensing connector. An external slider is movable axially within the spout and an internal slider is movable axially within the external slider. The internal slider is movable between a closed position that prevents the flow of fluid through the fitment and an open position that allows for the flow of fluid through the fitment. The internal slider is adapted to be moved between the closed and open positions by insertion of the dispensing connector into the external slider. The internal slider is biased toward the closed position when the dispensing connector is released as a result of temporary deformation of portions of the external slider by the internal slider pressed inwardly by the dispensing connector. The internal slider cooperates with the dispensing connector by means of locking lugs on a top edge thereof. A dispensing connector collar is disclosed, which may be threaded for threaded engagement with an external surface of the spout. In the dispensing position, O-rings on the dispensing connector sealingly engage with the external and internal slider.

Johnson represents a significant improvement in the art. In particular, due to the arrangement of parts, a component that has a significant inherent resilience (i.e. rubber or a spring) is not required; rather the entire fitment is preferably formed of plastic. Further, the relatively simple arrangement of parts facilitates both manufacture of the individual valve components and the assembly of the fitment. There nevertheless remains room in the art for improvement. For example, in the dispensing position, sealing engagement between the dispensing connector and fitment is provided by the O-ring on the dispensing connector.

Not draining the flexible bag substantially fully is a problem in the art. This results in product waste and creates problems during disposal. This invention addresses this problem.

SUMMARY

Accordingly, in one of its aspects, the present invention provides a fitment assembly comprising: a fitment for attachment to a container for holding and dispensing a fluid and having a generally cylindrical spout attached thereto, the fitment comprising a generally cylindrical external valve body movable to a fixed position within the spout; and a generally cylindrical internal valve body movable axially within the external valve body, the internal valve body movable between a closed position operable to prevent the flow of fluid through the fitment and an open position operable to allow the flow of fluid through the fitment, the internal valve body movable between closed and open positions by insertion of a dispensing connector into the external valve body adjacent the internal valve body, the internal valve body being biased toward the closed position; wherein the external valve body comprises a generally cylindrical body, wherein the cylindrical body comprises a top cylindrical portion and bottom cylindrical portion or a barrel seal, a valve seat attached to an end of top cylindrical portion by a plurality of radially spaced posts defining apertures therebetween, the posts being spaced from the spout to allow liquid to flow therethrough when the valve is in the open position; wherein said external valve body further comprises at least one circumferentially spaced aperture at the distal end of the barrel seal proximate to the container surface, and wherein said barrel seal of said external valve body protrudes beyond a spout of said container on which said fitment is attached and into said container such that said at least one circumferentially spaced aperture is located within said container.

In another aspect, this invention relates to a process for assembling a fitment on to a filled or unfilled container, comprising the steps as follows: (I) assembling a generally cylindrical internal slider valve into a generally cylindrical external valve body to form a valve body assembly into a primary seal position; (II) putting a cap on said external valve body of said valve body assembly; (III) assembling said assembly of said cap and said valve body assembly on to a generally cylindrical spout in a pre-cap position to form a fitment assembly; and (IV) affixing the assembly of Step (III) to said container wherein said fitment assembly comprises said fitment for attachment to said container for holding and dispensing a fluid, wherein said fitment has said spout attached thereto, said fitment further comprises said external valve body movable to a fixed position within said spout; and said internal valve body movable axially within said external valve body, said internal valve body movable between a closed position operable to prevent the flow of fluid through said fitment and an open position operable to allow the flow of fluid through said fitment, said internal valve body movable between closed and open positions by insertion of a dispensing connector into said external valve body adjacent said internal valve body, said internal valve body being biased toward the closed position; wherein when coupled to said fitment said dispensing connector compressively engages said external valve body to form a seal between said external valve body and said dispensing connector; wherein the external valve body comprises a generally cylindrical body, wherein the cylindrical body comprises a top cylindrical portion and bottom cylindrical portion or a barrel seal, a valve seat attached to an end of top cylindrical portion by a plurality of radially spaced posts defining apertures therebetween, the posts being spaced from the spout to allow liquid to flow therethrough when the valve is in the open position; wherein said external valve body further comprises at least one circumferentially spaced aperture at the distal end of the barrel seal proximate to the container surface, and wherein said barrel seal of said external valve body protrudes beyond a spout of said container on which said fitment is attached and into said container such that said at least one circumferentially spaced aperture is located within said container.

In yet another aspect, this invention relates to a process for dispensing fluid to or from a container, comprising: (I)

providing said container comprising said fluid, with a fitment attached to said container, wherein said fitment is capable of accepting a dispensing connector that is part of a dispensing apparatus, wherein said dispensing connector connects the supply of said fluid to said dispensing apparatus; (II) inserting said dispensing connector into said fitment to actuate an internal valve body within said fitment; (III) dispensing said fluid from said container through said dispensing apparatus; wherein said fitment assembly comprises: said fitment-attached to-said container for holding and dispensing said fluid and having a generally cylindrical spout attached thereto, said fitment comprising a generally cylindrical external valve body movable to a fixed position within said spout; and a generally cylindrical said internal valve body movable axially within said external valve body, said internal valve body movable between a closed position operable to prevent the flow of said fluid through said fitment and an open position operable to allow the flow of said fluid through said fitment, said internal valve body movable between closed and open positions by insertion of said dispensing connector into said external valve body adjacent said internal valve body, said internal valve body being biased toward said closed position; wherein the external valve body comprises a generally cylindrical body, wherein the cylindrical body comprises a top cylindrical portion and bottom cylindrical portion or a barrel seal, a valve seat attached to an end of top cylindrical portion by a plurality of radially spaced posts defining apertures therebetween, the posts being spaced from the spout to allow liquid to flow therethrough when the valve is in the open position; wherein said external valve body further comprises at least one circumferentially spaced aperture at the distal end of the barrel seal proximate to the container surface, and wherein said barrel seal of said external valve body protrudes beyond a spout of said container on which said fitment is attached and into said container such that said at least one circumferentially spaced aperture is located within said container; wherein said fitment assembly is made from a synthetic resin material.

BRIEF DESCRIPTION OF THE DRAWINGS

Embodiments of the present invention will be described with reference to the accompanying drawings, wherein like reference numerals denote like parts, and in which.

DETAILED DESCRIPTION OF THE INVENTION

In a liquid dispensing apparatus such as is used to dispense individual servings of beverages and the like, the syrups, flavorings and other ingredients are frequently supplied in collapsible containers enclosed and shipped within an outer container ("bag-in-box"). The shipping package or container is provided with a fitment that accepts a probe that is part of the dispensing apparatus in order to connect the supply of liquid to the dispensing apparatus. The fitment generally contains a valve that is actuated by the insertion of the probe of the dispensing apparatus in order to allow the liquid to flow into the dispensing apparatus. The fitment attached to the liquid container is generally termed a package connector and the probe or similar device on the dispensing apparatus that interacts with the package connector is generally termed a dispensing connector.

The Fitment Assembly—General

Figure 1:
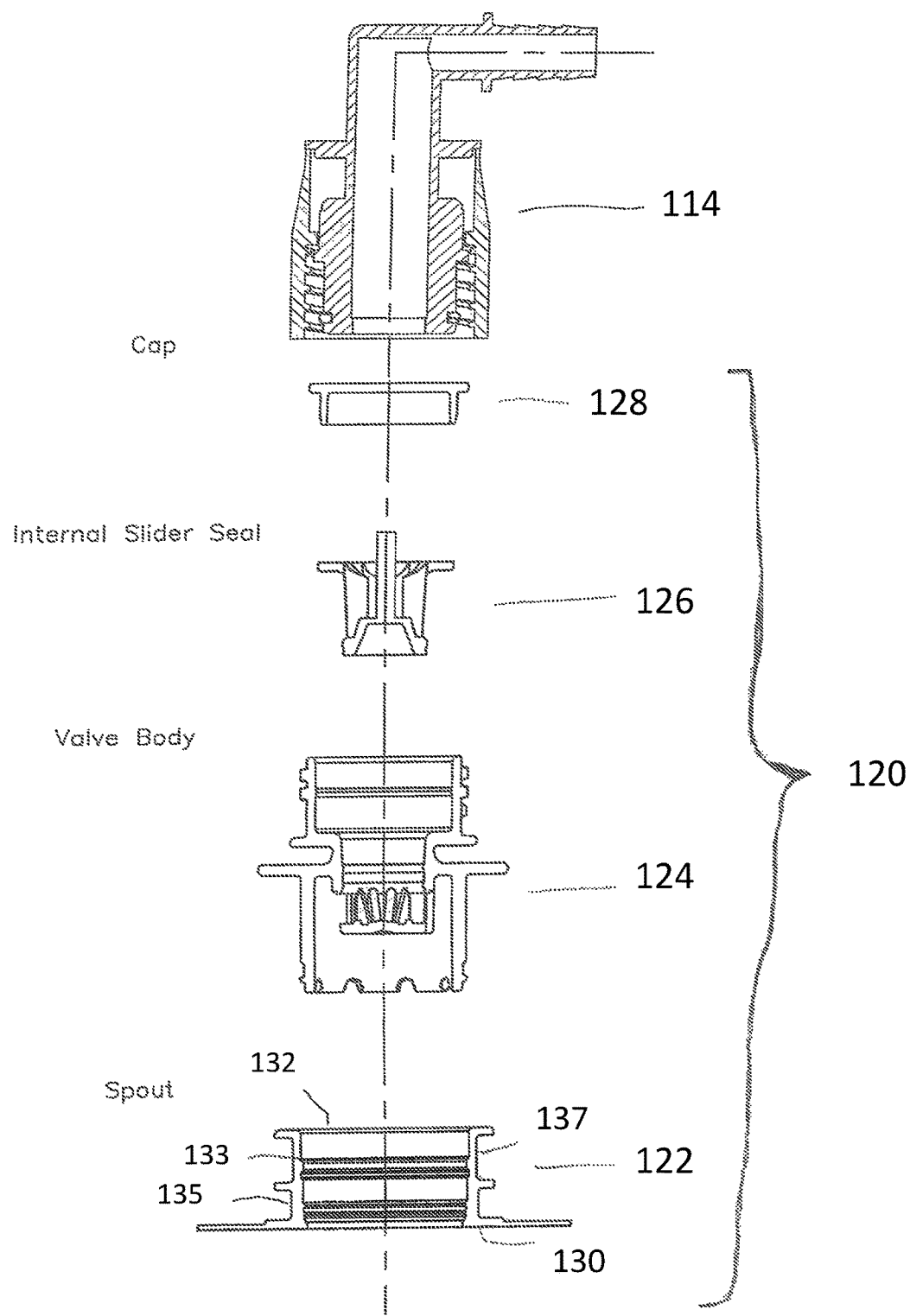
FIG. 1 illustrates an exploded cross-sectional side view of a first embodiment of the fitment assembly of the present invention with a dispensing connector.
Figure 2:
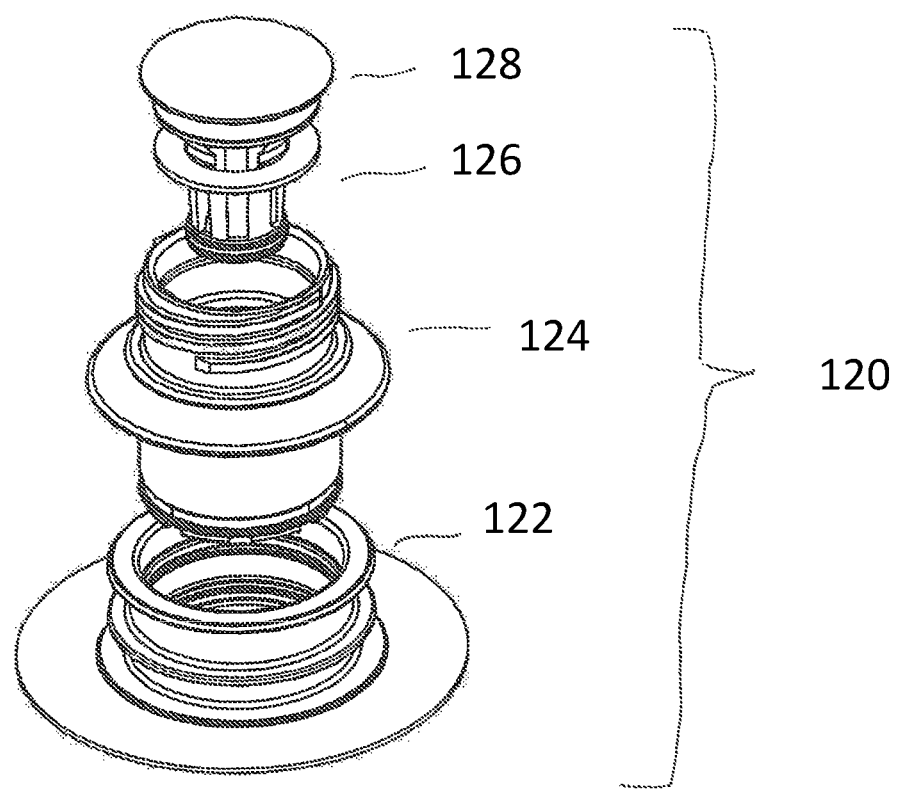
FIG. 2 illustrates an exploded view of the fitment.

With reference to FIGS. 1 and 2, the present invention includes a double slider valve fitment 120 for attachment to a container such as a flexible bag for holding liquid (not shown), the double slider valve fitment 120 being 120 that is engageable to a dispensing connector 114 connected to a service line.

The fitment 120 comprises a generally cylindrical spout 122 with a generally cylindrical external valve body 124 movable axially within the spout 122 and an internal valve body 126 movable axially within the external valve body 124. As will be described in further detail below, generally external valve body 124 is slideable to a secured position (full-cap position), while internal valve body 126 is repeatedly slideable to enable opening and closing of the valve. The internal valve body 126 is movable between a "closed" position that prevents fluid from flowing through the fitment 120 and an "open" position that allows fluid to flow from the container through the fitment 120. The internal valve body 126 is adapted to be moved between the closed and open positions by insertion of the dispensing connector 114 into the external valve body 124. The internal valve body 126 is sized to be received within the external valve body 124. The fitment 120 suitably further includes a cap 128.

Spout

The components of the fitment assembly 120 will now be described in more detail with reference to FIGS. 1-through 6B. The spout 122 is generally cylindrical in shape and one end is received by the dispensing connector 114 when the assembly is in a dispense position, as will be discussed further below. At the other end of the spout 122 there is a base portion 130 for attaching the spout 122 to a wall of a container such as a flexible bag (not shown). Methods and means for attaching the spout 122 to a wall of the container are well known in the art and a variety of attachment mechanisms may be used to secure the spout 122 to the container wall, such as by heat sealing or adhesive attachment or both.

Located at the opposing end of the spout 122 from the base portion 130 is the spout opening 132, which is adapted to receive the dispensing connector 114 therein. In one embodiment, the internal surface of the spout 122 suitably includes an integrally melded stop ridge 133 and sealing rings 135, both of which serve to limit the motion of the external valve body 124 at certain stages in the functioning of the fitment assembly 110. Suitable stop ridge and sealing rings are further described in U.S. Pat. No. 6,347,785 (Copp, et al.), which is incorporated herein by reference in its entirety.

The external surface 137 of the spout 122 preferably includes a series of external threads or flanges, which are adapted to mate with corresponding threads on a dispensing apparatus (not shown) or a collar with which a double slider fitment 110 may be used. The configuration of the external surface 137 of the spout 122 is not particularly restricted and may be altered in accordance with known ways to connect such surfaces e.g. a snap-fit arrangement could also be used. In the embodiment shown in FIGS. 1 through 6B, generally, the configuration of the external surface of the spout is not particularly restricted.

External Valve Body

Figure 3:
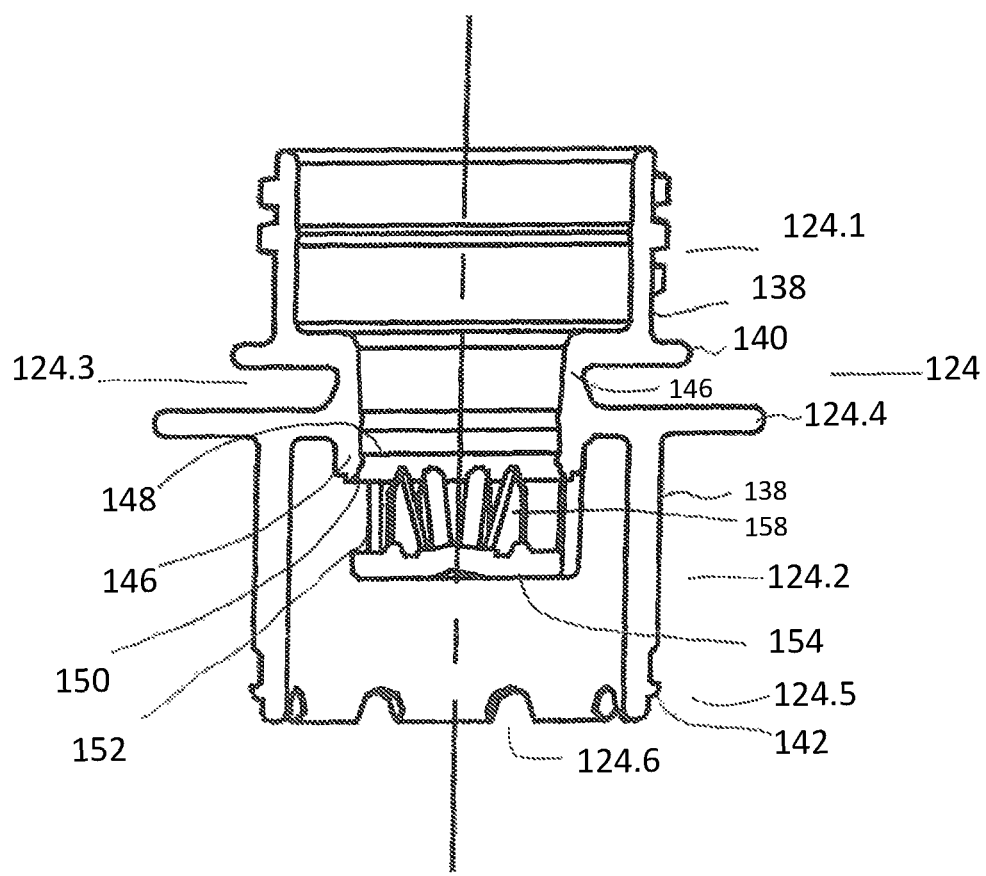
FIG. 3 illustrates a cross-sectional view of the external valve body.

The external valve body will be described with reference to FIGS. 1 through 6 and particularly FIG. 3.

The external valve body 124 is generally cylindrically shaped having two cylindrical portions—the top portion 124.1 and the bottom portion also known as the barrel seal 124.2. The top portion 124.1 and the barrel seal 124.2 are separated by a groove 124.3 on the external shell 138. The external shell includes the groove 124.3, and a stop ridge 140 and the handling ring 124.4 that form the groove 124.3. The groove 124.3 is nominally in the middle portion of the external valve body 124. The external shell 138 also includes a positioning ring 142 at the opposing end. When the external valve body 124 is positioned within the spout 122, the positioning ring 142 is located adjacent the base portion 130 of the spout 122, and the stop ridge 140 is located adjacent the spout opening 132. Suitably, above stop ridge 140, the external surface 138 may be engageable with the dispensing connector 114 . . . . In the embodiment shown in FIGS. 1 through 6B, threaded portion 144 is threadably engageable with the dispensing connector 114.

The lower portion of the external valve body 124 is also called the barrel seal 124.2 that extends further below the handling ring or the flange 124.4 in a cylindrical fashion. At its distal end 124.5, spaced on the wall of the barrel seal 124.2 are situated one or more circumferentially, (preferably) semi-circular apertures 124.6 that help drain the fluid from the bag substantially fully. In the full-cap position (see FIG. 6B), the distal end 124.5 of the external valve body 124 is not flush (generally, or otherwise) with the base portion 130 of the spout 122. In fact, the distal end 124.5 of the barrel seal 124.2 extends into the bag such that at least the circumferentially spaced apertures 124.6 are open to the passage of the fluid from the bag for its dispensation through the internal slider 126 and the dispensing connector 114.

As the fluid is drained from the flexible bag, the bag collapses and advances closer to the spout 122. For a spout base portion 130 that is nominally flush with the plane of the flexible bag, the planar laminate side of the bag opposing the planar laminate side on which the spout 122 is attached, may likely collapse on the spout base portion 130, effectively shutting down or reducing fluid flow and its dispensation. The residual usable fluid in the bag may thus not be drained fully and will be wasted. However, in the present invention, the valve body 124, through its barrel seal 124.2 at its distal end 124.5 extends past the base portion 130 of the spout and into the flexible bag cavity. Moreover, even if the bag were to collapse on the distal end 124.5 of the barrel seal 124.2, the circumferentially spaced apertures 124.6, which have an orientation normal to the plane of the collapsed planar side of the bag, will provide the channel for continued dispensing of the liquid through the fitment assembly 110 and the service-line.

Within the external valve body 124, adjacent the end with the positioning ring 142, in one embodiment, there is an interior projection 146 that extends around the internal circumference of the shell 138. The projection 146 has an upper surface 148 that faces the end of the shell 138 containing the stop ridge 140, and a lower edge 150 that faces the end of the shell 138 containing the positioning ring 142. Suitably, projection or ledge 146 has an inverted "L" shape as shown in the Figures. Extending away from the lower edge 150 towards the end of the shell 138, which includes the stop ridge 140, are a series of radially spaced posts 152 defining apertures 153 therebetween. The posts 152 support a valve seat 154 at their lower ends. The posts 152 extend substantially parallel to the shell 138 of the external valve body 124 and are spaced from the shell 138 such that liquid may flow between the shell 138 and the posts 152 and through the space between each post 152. The valve seat 154 is substantially circular and extends between the lower ends of the spaced posts 152. The valve seat 154 includes a plurality of spaced projections 158 that extend upwardly from the valve seat 154 towards the projection 146. The projections 158 are preferably centrally located on the valve seat 154 and are radially spaced thereon and are operable to be received in the internal valve body 126 as will be described below. It will be understood by a person skilled in the art that the projections 158 may be spaced in any pattern and may form any shape that performs the same function as the projections 158.

Figure 6A:
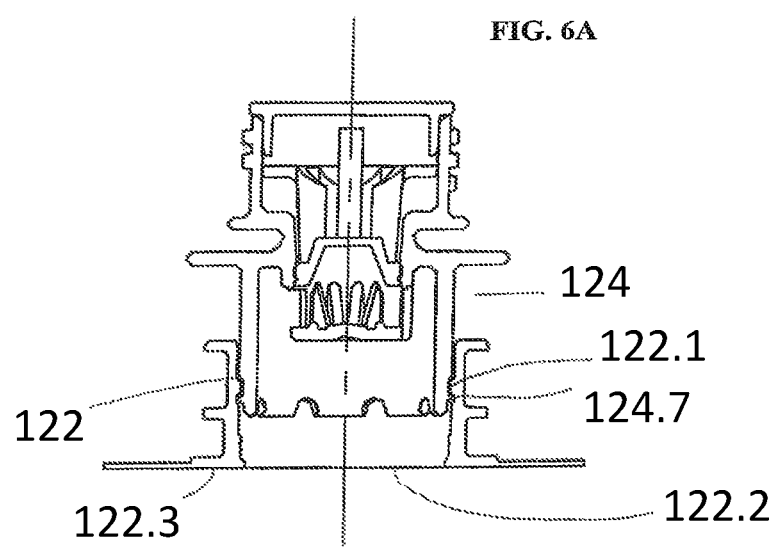
FIG. 6A illustrates a cross-sectional side view of the external valve body connected to the spout in the pre-cap position.
Figure 6B:
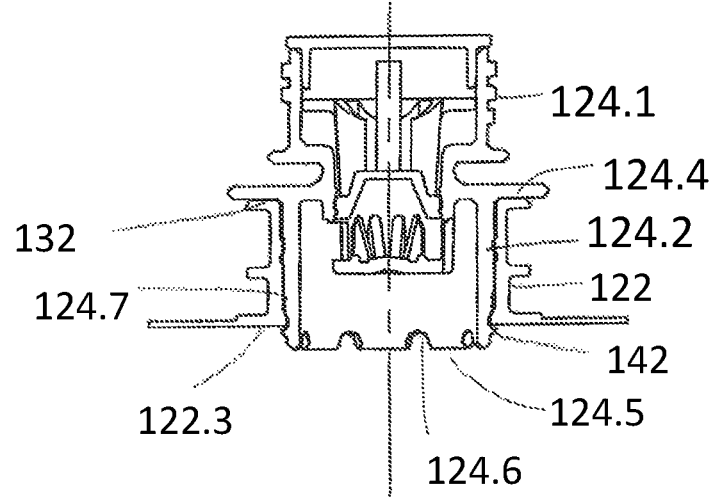
FIG. 6B illustrates a cross-sectional side view of the external valve connected to the spout in the full-cap position.
Figure 7:
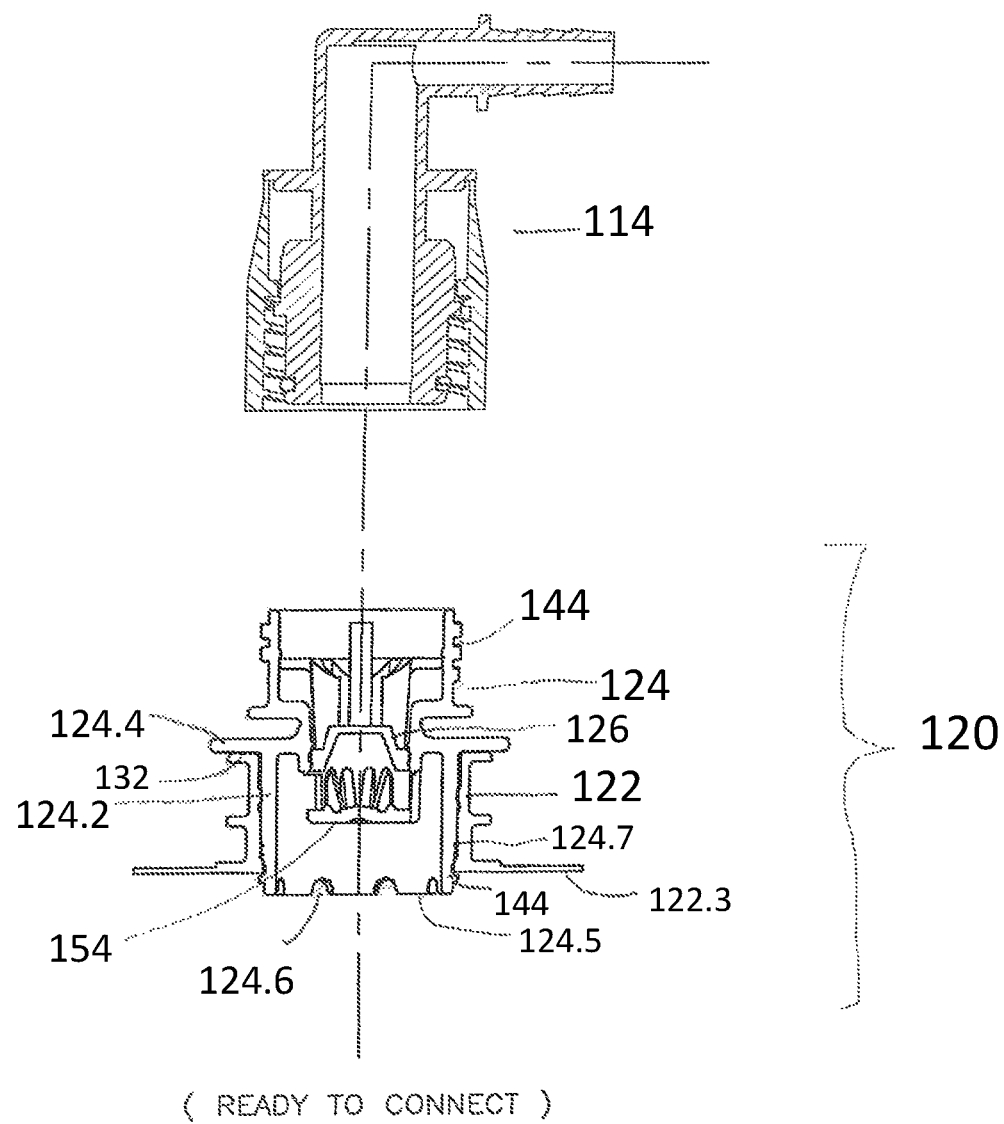
FIG. 7 illustrates the dispensing connector ready-to-connect with the external valve body attached in a full-cap position with the spout.
Figure 8:
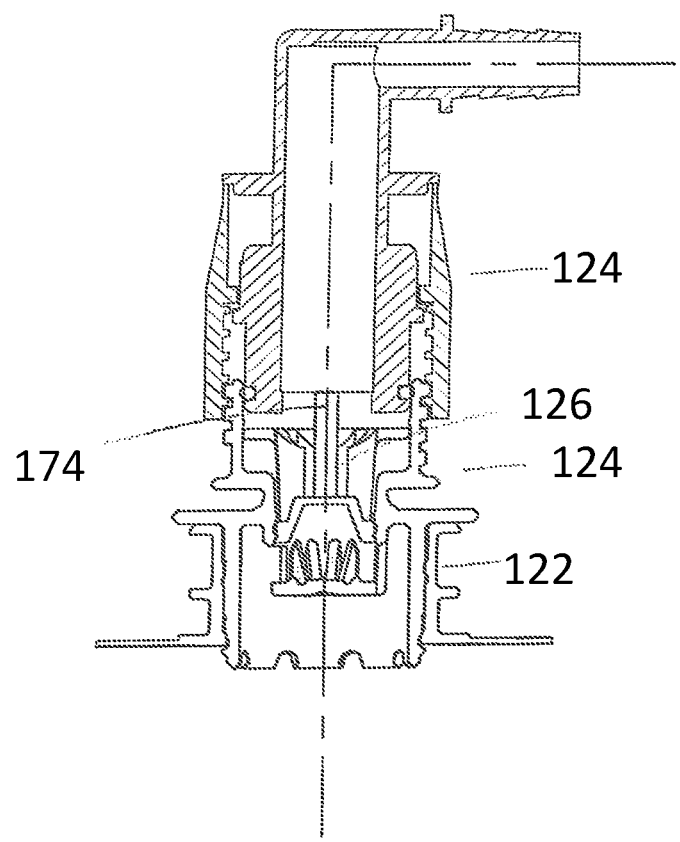
FIG. 8 illustrates the dispensing connector engaged with the external valve body through the O-ring.

FIGS. 6A and 6B show the pre-cap position and the full cap position of the external valve body 124 attached to the spout 122. In the pre-cap position, the external valve body 124 (and the fitment) are attached to the spout 122 of the bag, but the bag is not pierced for opening it to the fitment 120 and the dispensing connector 114 of the service-line. The circular lock bead 124.7 at the distal end of the external valve body 124 is locked with a groove on the inside wall 122.1 of the spout, which creates the pre-cap lock. The pre-cap lock is situated in approximately the middle portion of the spout 122 and a small distance away from the actual bag surface 122.2 that is nominally flush with the bottom flange 122.3 of the base portion 130 of the spout 122.

In the full-cap position, the external valve body 124 is manually pushed downward towards the bag to overcome the lock strength of the circular lock bead 124.7. The bag is pierced and the distal end 124.5 of the external valve 124 and the circumferentially-placed apertures 124.6 now protrude through the bag and extend on the inside of the bag. The barrel seal structure 124.2 that extends beyond the seal of the external valve body 124 helps in providing this extension. In the full cap position the handling ring 124.4 now sits on top of the spout's 122 top surface 132 and the bottom positioning ring 142 of the external valve 124 now locks with the bottom surface of the spout flange.

Internal Valve Body

Figure 4A:
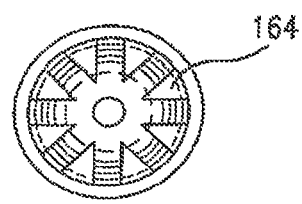
FIG. 4A illustrates a partial cross-sectional top view of the internal valve body.
Figure 4B:
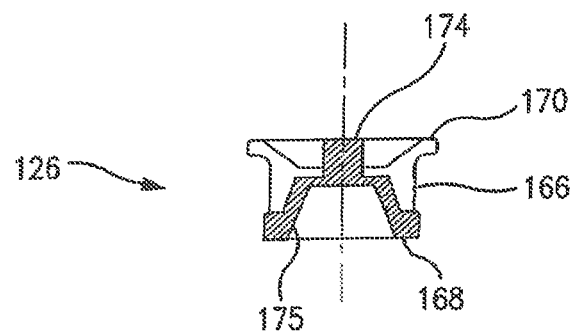
FIG. 4B illustrates a partial cross-sectional side view of the internal valve body shown in FIG. 4A.
Figure 4C:
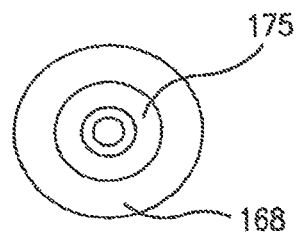
FIG. 4C illustrates a partial cross-sectional bottom view of the internal valve body shown in FIGS. 4A and 4B.

The internal valve body 126 will be described with reference to FIGS. 1 through 6B and especially FIGS. 4A, 4B, and 4C. Located on the internal valve body 126 are a series of ports 164 that allow the passage of fluid therethrough when the internal valve body 126 is in the open position. When in the open position, the ports 164 are in fluid communication with the apertures 153 between the posts 152 of the external valve body 124.

Suitably, the internal valve body 126 includes a generally cylindrical body 166 with a base ring 168 that extends around one end of the body 166, and a top ring 170 that extends outwardly from and around the opposing end of the body 166 from the base ring 168. A central post 174 extends away from the body 166 at the opposing end to the base ring 168, and is operable to engage the dispensing connector 114, when the fitment 120 is attached to the dispensing connector 114.

The body 166 is sized to be received within the external valve body 124 extending beyond the projection 146 of the external valve body 124 and operable to abut the valve seat 154. The top ring 170 suitably is sized to extend beyond the circumference of the body 166 to rest against and abut the projection 146 when the internal valve body 126 is in the open position. In the open position, the insertion of the dispensing connector 114 moves the internal valve body 126 towards the valve seat 154 and positions the base ring 168 of the body 166 adjacent the valve seat 154. The projections 158 on the valve seat 154 are biased inwardly by the internal walls 175 of the body 166 of the internal valve body 126.

In one embodiment, the internal walls 175 of the body 166 are sloped inwardly to bias the projections 158 inwardly when the plug 126 is located adjacent the valve seat 154. When the dispensing connector 114 is removed, the projections 158 will return to their normally biased position and flex outwardly. When the projections 158 move outwardly, the internal valve body 126 will be forced away from the valve seat 154 and the internal valve body 126 will return to the closed position. Other embodiments may be used that force the projections to bend away from their normal position upon insertion of the dispensing connector 114 into the fitment, provided that when the dispensing connector 114 is removed the projections force the internal valve body 126 away from the valve seat 154 to the closed position. While the projections 158 are biased inwardly and then flex to their initial position, the required inherent resilience is fairly limited and all parts of the fitment 120 may be formed of a fairly rigid material.

Cap

Figure 5:
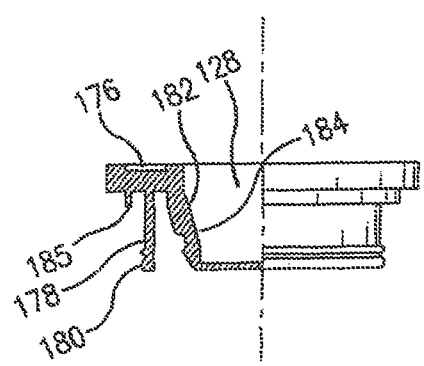
FIG. 5 illustrates a partial cross-sectional side view of the cap.

The fitment assembly 120 preferably further includes a cap 128 as shown in FIG. 5. In one embodiment the cap 128 may include a cover 176 and a skirt 178 bearing an outer retaining ring 180 and an internal cylinder 182 bearing an inner retaining ring 184 which engages the cap 128 with the external valve body 124 when the cap 128, external valve body 124, and internal valve body 126 are removed as a unit in order to fill the container. Suitably, the cap 128 may be sized so that if present, the skirt 178 can be received within the spout 122. The cap 128 may also include a smaller outer skirt 185 sized to sit about the top periphery of spout 122, when the fitment is capped. While the configuration of the cap 128 is not particularly restricted and is within the purview of a person skilled in the art, an example of a suitable cap 128 is disclosed in U.S. Pat. No. 6,347,785. Other alternative cap configurations will be apparent to persons skilled in the art.

Materials

Although the fitment assembly 120 of the present invention may be made of any material having suitable properties, preferably, it is made of a synthetic resin material that can be melded to form its parts. The synthetic resin material must have sufficient resiliency so that the projections 158 will return to their rest position when a deforming pressure is released. If the fitment assembly 120 is made from a single synthetic resin material, recycling of the valve is made particularly easy, because the used valve can be ground up, re-melted and remolded into new valves. It is preferred that the fitment assembly 120 be made from a synthetic resin that is the same as that used to form the liquid-containing bag with which the fitment is used. Such compatibility further increases the ease of recycling the valve. A preferred synthetic resin for the valve is polypropylene. The valve can also be made of high-density polyethylene, polystyrene, nylon or the like.

Fluid Dispensing

This section refers to FIGS. 7-10. When the internal valve body 126 returns to the closed position, it may return to either its initial position or to one in which the top ring 170 is lower than in the initial position, i.e. closer to the ledge 146, provided that there is a seal between the internal valve body 126 and the external valve body 124, and no fluid can pass through the fitment 120. The closed position referred to includes all such positions in which the internal valve body 126 is moved away from the valve seat 154 and where no fluid can pass through the fitment 120.

It will be understood by a person skilled in the art in light of the above description that the external valve body 124 is operable to move along the inside of the spout 122 in a smooth telescoping movement while maintaining continuous contact with the spout 122. Likewise, the internal valve body 126 is operable to move along the inside of the external valve body 124 in a smooth telescoping movement. Further, the internal valve body 126 acts like a plug within the external valve body 124 and is seated within the external valve body 124 in the open position to allow fluid to pass through and is unseated in the closed position to prevent fluid from passing through.

FIG. 6A illustrates a cross-sectional side view of the double slider valve fitment 120 in a pre-cap position. In this position, the fitment 120 is removably positioned within the spout 122, in order to be readily removable for filling of the container directly through an open spout 122. FIG. 6B illustrates a cross-sectional side view of the double slider valve fitment 120 in a full-cap position. This position is suitable for a filled container ready for delivery to the end-user. In this position, the stop ridge 140 and the positioning ring 142 of the external valve body 124 are engaged with the interior of the spout 122, so that the double slider valve fitment 120 is securely positioned within the spout 122. The cap 128 is secured to the fitment 120.

Figure 10:
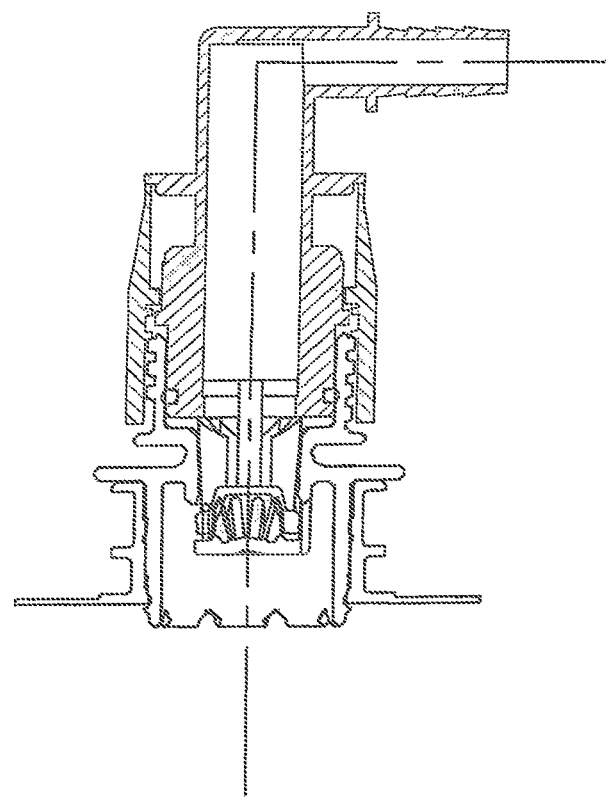
FIG. 10 illustrates the fitment position in connection with the dispensing connector where the connector now opens the internal slider ports for fluid flow.

FIG. 10 illustrates a partial cross-sectional side view of the collar 112 and the double slider valve fitment 120 in a dispense position with the dispensing connector 114. In this position, the user removes the cap 128. The dispensing connector 114 is engaged with the double slider valve fitment 120.

In the ready-to-connect position (FIG. 7), the external valve 124, the internal valve 126 and the spout 122 (fitment 120) are in the full-cap position, wherein the external valve body 124 has been (manually) pushed downward towards the bag to overcome the lock strength of the circular lock bead 124.7. The bag has been pierced and the distal end 124.5 of the external valve 124 and the circumferentially-placed apertures 124.6 now protrude through the bag and extend on the inside of the bag. The length of the barrel seal structure 124.2 that extends beyond the seat 154 of the external valve body 124 provides this extension. In the full-cap position, the handling ring 124.4 now sits on top of the spout's 122 top surface 132 and the bottom ring 142 of the external valve 124 now locks with the bottom surface of the spout flange 122.3. Also, the dispensing connector 114 with or without a collar (compressive or otherwise) is available for connecting with the fitment 120.

The dispensing connector 114 moves the valve to an open position. In one embodiment as the dispensing connector 114 is threaded onto the external valve body 124, it pulls the dispensing connector 114 down into the external valve body 124 where the nose of the dispensing connector 114 comes into contact with the internal valve body 126 at its pin 174. See FIG. 8 for example.

Figure 9:
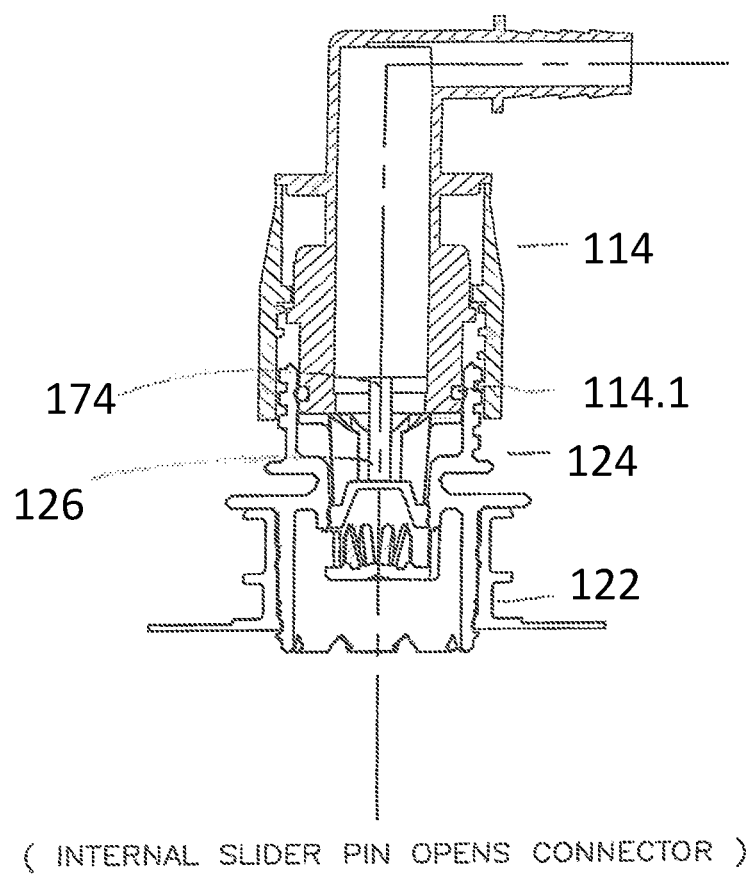
FIG. 9 illustrates the fitment position in connection with the dispensing connector where the internal slider pin opens the connector.

In one embodiment, as shown in FIG. 9, the threading then moves the internal valve body 126 down into the dispensing position where a first seal and second seal associated with an O-ring 114.1 on the dispensing connector 114 are made during this action.

As the dispensing connector 114 is threadably engaged with the threaded portion 144 of the external valve body 124, in one embodiment, it applies an inward force on the internal valve body 126 and the internal valve body 126 is moved axially within the external valve body 124 towards the valve seat 154. The top ring 170 of the internal valve body 126 rests adjacent the upper surface 148 of the ledge 146, preventing further axial movement of the internal valve body 126 towards the valve seat 154. It will be understood by a person skilled in the art that further axial movement of the internal valve body 126 may be prevented by either the top ring 170 abutting the ledge 146 or the position of the valve seat 154 adjacent the internal valve body 126 or by both. The base ring 168 rests against the valve seat 154 and the projections 158 on the valve seat 154 are biased inwardly by the internal walls 175 of the body 166 of the internal valve body 126. In this position, the ports 164 of the internal valve body 126 are in fluid communication with the apertures 153 located between the posts 152 on the external valve body 124, and fluid can flow from the container through the barrel seal and between the shell 138 and the valve seat 154 through the apertures 153 between the posts 152 and through the ports 164 on the internal valve body 126, into the dispensing connector 114.

Once the dispensing connector 114 is removed, the pressure on the internal valve body 126 is released and projections 158 will move to their normal position and push outwardly against the internal walls 175 of the body 166, which will push the internal valve body 126 up and away from the valve seat 154 towards the closed position. FIG. 3 illustrates a schematic of the double slider fitment 120 of the present invention and a dispensing connector 114 in a ready-to-connect position. As shown, the dispensing connector 114 is removed and the valve moves to a closed position of the fitment 120. The internal valve body 126 is received in the external valve body 124 with the top ring 170 spaced from the upper surface 148 of the ledge 146. The base ring 168 of the internal valve body 126 abuts against the upper ends of the posts 152 of the external valve body 124 and blocks any flow of fluid through the apertures 153 located between the posts 152. The closed position prevents any fluid from passing through the fitment 120 into the dispensing connector 114.

A portion of the spout 122 may be received within the receiving space of the dispensing connector 114. Additional collars and connectors that can be used with this invention are described in U.S. Pat. No. 8,578,979, which is incorporated by reference herein in its entirety.

While this invention has been described with reference to illustrative embodiments and examples, the description is not intended to be construed in a limiting sense. Thus, various modifications of the illustrative embodiments, as well as other embodiments of the invention, will be apparent to persons skilled in the art upon reference to this description. All publications, patents and patent application referred to herein are incorporated by reference in their entirety to the same extent as if each individual publication, patent or patent application was specifically and individually indicated to be incorporated by reference in its entirety.

Listing of Parts

| Part Numbers | Part Description |
| --- | --- |
| 114 | Dispensing connector |
| 114.1 | O-ring |
| 120 | Fitment assembly; Fitment; Double slider valve fitment |
| 122 | Spout |
| 122.1 | Groove for locking external valve body in pre-cap position |
| 122.2 | Flexible bag surface |
| 122.3 | Base flange of the spout |
| 124 | External valve body; Valve body |
| 124.1 | Top portion of the external valve body |
| 124.2 | Bottom portion of the external valve body; Barrel seal |
| 124.3 | Groove on the external shell of the external valve body |
| 124.4 | Handling ring |
| 124.5 | Distal end of the external valve body |
| 124.6 | Circumferentially spaced apertures |
| 124.7 | Circular lock bead |
| 126 | Internal valve body; Internal slider; Internal slider seal |
| 128 | Cap |
| 130 | Base portion |
| 132 | Spout opening |
| 133 | Stop ridge |
| 135 | Sealing rings |
| 137 | Externa surface of spout |
| 138 | External shell of external valve body |
| 140 | Stop ridge |
| 142 | Positioning ring |
| 144 | Threaded portion |
| 146 | Projection |
| 148 | Upper surface of projection |
| 150 | Lower edge of projection |
| 152 | Radially spaced posts |
| 153 | Apertures |
| 154 | Valve seat |
| 158 | Spaced projections |
| 164 | Ports |
| 166 | Generally cylindrical body |
| 168 | Base ring |
| 170 | Top ring |
| 174 | Post; Slider pin |
| 175 | Internal walls |
| 176 | Cover |
| 178 | Skirt |
| 180 | Outer retaining ring |
| 182 | Internal cylinder |
| 184 | Internal retaining ring |
| 185 | Outer descending skirt |

What is claimed:

1. A fitment assembly comprising:
   (A) a fitment for attachment to a container for holding and dispensing a fluid, and
   (B) a generally cylindrical spout attached to said fitment; the fitment comprising:
   (I) a generally cylindrical external valve body movable to a fixed position within the spout,
   (II) a generally cylindrical internal valve body movable axially within the external valve body,
   wherein the internal valve body is movable between a closed position operable to prevent the flow of fluid through the fitment and an open position operable to allow the flow of fluid through the fitment;
   wherein the internal valve body is movable between closed and open positions by insertion of a dispensing connector into the external valve body adjacent the internal valve body;

wherein the internal valve body is biased toward the closed position;

wherein the external valve body comprises a generally cylindrical body, wherein the cylindrical body comprises a top cylindrical portion and a bottom cylindrical portion or a barrel seal;

wherein a valve seat is attached to an end of top cylindrical portion by a plurality of radially spaced posts defining apertures therebetween, the posts being spaced from the spout to allow liquid to flow therethrough when the valve is in the open position;

wherein said external valve body further comprises at least one circumferentially spaced aperture at the distal end of the barrel seal proximate to the container surface; and wherein said barrel seal of said external valve body protrudes beyond the spout of said container on which said fitment is attached and into said container such that said at least one circumferentially spaced aperture is located within said container.

2. The fitment assembly as recited in claim 1, wherein the internal valve body comprises a body having a plurality of ports therein that allow fluid flow therethrough when the valve is in the open position.

3. The fitment assembly as recited in claim 1, wherein the valve seat further comprises a plurality of spaced projections that extend from the valve seat toward the exterior of the container.

4. The fitment assembly as recited in claim 1, further comprising a removable cap engageable with the external valve body.

5. The fitment assembly as recited in claim 1 made from at least one synthetic material.

6. The fitment assembly as recited in claim 1, wherein at least one part of said fitment assembly and/or said spout is made from polypropylene.

7. The fitment assembly of claim 5, wherein said synthetic material is the same as that for the container.

8. The fitment assembly of claim 5, wherein said synthetic material is selected from the group consisting of polypropylene, high-density polyethylene, polystyrene, and nylon.

9. A process for assembling a fitment on to a filled or unfilled container, comprising the steps as follows:
 (I) assembling a generally cylindrical internal slider valve into a generally cylindrical external valve body to form a valve body assembly into a primary seal position;
 (II) putting a cap on said external valve body of said valve body assembly;
 (III) assembling said assembly of said cap and said valve body assembly on to a generally cylindrical spout in a pre-cap position to form a fitment assembly; and
 (IV) affixing the assembly of Step (III) to said container;
 wherein said fitment assembly comprises said fitment for attachment to said container for holding and dispensing a fluid;
 wherein said fitment has said spout attached thereto, said fitment further comprises said external valve body movable to a fixed position within said spout; and said internal valve body movable axially within said external valve body, said internal valve body movable between a closed position operable to prevent the flow of fluid through said fitment and an open position operable to allow the flow of fluid through said fitment, said internal valve body movable between closed and open positions by insertion of a dispensing connector into said external valve body adjacent said internal valve body, said internal valve body being biased toward the closed position;
 wherein when coupled to said fitment said dispensing connector compressively engages said external valve body to form a seal between said external valve body and said dispensing connector; wherein the external valve body comprises a generally cylindrical body, wherein the cylindrical body comprises a top cylindrical portion and bottom cylindrical portion or a barrel seal, a valve seat attached to an end of top cylindrical portion by a plurality of radially spaced posts defining apertures therebetween, the posts being spaced from the spout to allow liquid to flow therethrough when the valve is in the open position; and
 wherein said external valve body further comprises at least one circumferentially spaced aperture at the distal end of the barrel seal proximate to the container surface, and wherein said barrel seal of said external valve body protrudes beyond a spout of said container on which said fitment is attached and into said container such that said at least one circumferentially spaced aperture is located within said container.

10. A process for dispensing fluid to or from a container, comprising:
 (I) providing said container comprising said fluid, with a fitment attached to said container, wherein said fitment is capable of accepting a dispensing connector that is part of a dispensing apparatus, wherein said dispensing connector connects the supply of said fluid to said dispensing apparatus; and
 (II) inserting said dispensing connector into said fitment to actuate an internal valve body within said fitment;
 (III) dispensing said fluid from said container through said dispensing apparatus;
 wherein said fitment assembly comprises:
 (A) a fitment for attachment to a container for holding and dispensing a fluid, and
 (B) a generally cylindrical spout attached to said fitment;
 the fitment comprising:
 (i) a generally cylindrical external valve body movable to a fixed position within the spout,
 (ii) a generally cylindrical internal valve body movable axially within the external valve body,
 wherein the internal valve body is movable between a closed position operable to prevent the flow of fluid through the fitment and an open position operable to allow the flow of fluid through the fitment;
 wherein the internal valve body is movable between closed and open positions by insertion of a dispensing connector into the external valve body adjacent the internal valve body;
 wherein the internal valve body is biased toward the closed position;
 wherein the external valve body comprises a generally cylindrical body, wherein the cylindrical body comprises a top cylindrical portion and a bottom cylindrical portion or a barrel seal;
 wherein a valve seat is attached to an end of top cylindrical portion by a plurality of radially spaced posts defining apertures therebetween, the posts being spaced from the spout to allow liquid to flow therethrough when the valve is in the open position;
 wherein said external valve body further comprises at least one circumferentially spaced aperture at the distal end of the barrel seal proximate to the container surface; and wherein said barrel seal of said external valve body protrudes beyond the spout of said container on which said fitment is attached and into said container such that said at least one circumferentially spaced aperture is located within said container; and wherein said fitment assembly is made from at least one synthetic resin material.

11. The process as recited in claim 10, wherein the internal valve body comprises a body having a plurality of ports therein that allow fluid flow therethrough when the valve is in the open position.

12. The process as recited in claim 10, wherein the valve seat further comprises a plurality of spaced projections that extend from the valve seat toward the exterior of the container.

13. The process as recited in claim 10, further comprising a removable cap engageable with the external valve body.

14. The process as recited in claim 10, wherein at least one part of said fitment assembly and/or said spout is made from polypropylene.

15. The process of claim 14, wherein said synthetic material is the same as that for the container.

16. The process of claim 14, wherein said synthetic material is selected from the group consisting of polypropylene, high-density polyethylene, polystyrene, and nylon.

* * * * *